(12) United States Patent
Fukawatase et al.

(10) Patent No.: US 10,632,884 B2
(45) Date of Patent: Apr. 28, 2020

(54) VEHICLE SEAT

(71) Applicant: TOYOTA JIDOSHA KABUSHIKI KAISHA, Toyota-shi, Aichi-ken (JP)

(72) Inventors: Osamu Fukawatase, Miyoshi (JP); Shun Ito, Inazawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/199,697

(22) Filed: Nov. 26, 2018

(65) Prior Publication Data

US 2019/0217758 A1 Jul. 18, 2019

(30) Foreign Application Priority Data

Jan. 18, 2018 (JP) ................. 2018-006569

(51) Int. Cl.
*B60R 21/207* (2006.01)
*B60N 2/68* (2006.01)
(Continued)

(52) U.S. Cl.
CPC ............ *B60N 2/688* (2013.01); *B60N 2/4214* (2013.01); *B60N 2/4221* (2013.01); *B60N 2/4228* (2013.01); *B60N 2/4235* (2013.01); *B60N 2/4279* (2013.01); *B60N 2/42709* (2013.01); *B60R 21/00* (2013.01); *B60R 21/16* (2013.01); *B60R 21/207* (2013.01); *B60R 22/00* (2013.01);
(Continued)

(58) Field of Classification Search
CPC ........ B60N 2/68; B60N 2/002; B60N 2/7094; B60N 2/42709; B60N 2/4228; B60N 2/64; B60R 21/207; B60R 2021/23146; B60R 21/23138; A47C 4/54; B62D 21/15
See application file for complete search history.

(56) References Cited

U.S. PATENT DOCUMENTS 6,203,105 B1 * 3/2001 Rhodes, Jr. .............. A47C 4/54
297/284.6
7,784,866 B2 * 8/2010 Yoshikawa ........... B60R 21/207
280/730.1
(Continued)

FOREIGN PATENT DOCUMENTS

JP H07-047840 A 2/1995
JP 2009-539698 A 11/2009
(Continued)

*Primary Examiner* — Shin H Kim
(74) *Attorney, Agent, or Firm* — Oliff PLC (57) ABSTRACT

A vehicle seat mounted with an occupant restraint device, the vehicle seat includes: a seat cushion frame; a seatback frame including a seatback side frame extending in a seat vertical direction at a seat width direction end portion of the seatback frame, the seatback frame being swingable at a seat rear end side of the seat cushion frame, and the seatback frame extending from the seat rear end side toward a seat upper side; a metal inflating body disposed along the seatback side frame, and configured so as to be stretched out toward a seat lower side such that a lower end of the metal inflating body abuts a vehicle floor surface; and a drive member configured to stretch out the metal inflating body in a case in which a vehicle collision at a seat front side occurs or the vehicle collision at the seat front side has been predicted.

5 Claims, 7 Drawing Sheets

(51) Int. Cl.
  *B60R 22/26*   (2006.01)
  *B60N 2/427*   (2006.01)
  *B60N 2/42*    (2006.01)
  *B60R 21/00*   (2006.01)
  *B60R 22/00*   (2006.01)
  *B60R 21/16*   (2006.01)
  *B60R 21/231*  (2011.01)
  *B60R 22/195*  (2006.01)
  *B60R 21/235*  (2006.01)

(52) U.S. Cl.
  CPC ........ B60R 22/26 (2013.01); *B60R 21/23138* (2013.01); *B60R 2021/0006* (2013.01); *B60R 2021/0009* (2013.01); *B60R 2021/0048* (2013.01); *B60R 2021/161* (2013.01); *B60R 2021/23107* (2013.01); *B60R 2021/23146* (2013.01); *B60R 2021/23161* (2013.01); *B60R 2021/23528* (2013.01); *B60R 2022/1957* (2013.01)

(56) References Cited

U.S. PATENT DOCUMENTS

| | | | | |
|---|---|---|---|---|
| 2006/0119149 | A1* | 6/2006 | Yoshikawa | B60N 2/42718 297/216.1 |
| 2009/0267386 | A1 | 10/2009 | Persson | |
| 2011/0241391 | A1* | 10/2011 | Lamparter | B60N 2/42709 297/216.1 |
| 2012/0043791 | A1* | 2/2012 | Kojima | B60R 21/207 297/216.13 |
| 2012/0306250 | A1* | 12/2012 | Line | B60N 2/68 297/353 |
| 2013/0285426 | A1* | 10/2013 | Arant | B60N 2/62 297/284.1 |
| 2014/0103626 | A1* | 4/2014 | Seki | B60N 2/4228 280/730.2 |
| 2015/0076879 | A1* | 3/2015 | Line | A47C 7/22 297/284.2 |
| 2015/0076885 | A1* | 3/2015 | Stone | B60N 2/686 297/404 |
| 2015/0232008 | A1* | 8/2015 | Zimmerbeutel | B60N 2/682 297/452.11 |
| 2015/0336477 | A1* | 11/2015 | Matsui | B60N 2/682 297/344.15 |
| 2016/0046207 | A1* | 2/2016 | Arant | B60N 2/62 297/284.6 |
| 2018/0236962 | A1 | 8/2018 | Ohno et al. | |

FOREIGN PATENT DOCUMENTS

| | | |
|---|---|---|
| JP | 2010-132079 A | 6/2010 |
| JP | 2011-005978 A | 1/2011 |
| WO | 2016/174785 A1 | 11/2016 |

* cited by examiner

VEHICLE SEAT

CROSS-REFERENCE TO RELATED APPLICATION

This application claims priority under 35 USC 119 from Japanese Patent Application No. 2018-6569 filed Jan. 18, 2018, the disclosure of which is incorporated by reference herein in its entirety.

BACKGROUND

Technical Field

The present disclosure relates to a vehicle seat.

Related Art

The development of self-driving vehicles has been progressing in recent times. Such self-driving vehicles do not require a driver to sit in a vehicle seat facing the vehicle front during self-driving, allowing greater movement of vehicle seats and rotation of vehicle seats so as to face toward the vehicle rear to enable conversation with an occupant in a rear seat, for example.

In such cases, occupant restraint devices such as seatbelts are provided at vehicle seats to allow greater movement of vehicle seats than in existing vehicles, and to allow rotation and so on of vehicle seats in plan view.

Namely, vehicle seats are being provided with a structure in which a retractor or the like is inbuilt inside a seatback to pull a seatbelt into the seatback from a shoulder portion of the seatback, as well as an airbag for use in a frontal collision and an airbag for use in a side-on collision (see International Publication (WO) No. 2016/174785).

SUMMARY

However, mounting a restraint device to a vehicle seat results in a large impact load being input to the vehicle seat through the restraint device by an occupant who moves under inertia in a collision.

In the structures of existing restraint devices, impact load that acts accompanying inertial movement of an occupant is also input to a vehicle body side at which the restraint device is attached. When a restraint device is mounted to a vehicle seat, impact load is concentrated on the vehicle seat and on an attachment portion of the vehicle seat to the vehicle body.

In particular, in cases in which the restraint device is configured by a seatbelt, impact load toward the vehicle front acts on the seatback as a result of inertial movement of the occupant in a frontal collision, causing the seatback to tilt forward (referred to hereafter as "forward collapse").

There is demand to raise the rigidity of the vehicle seat in a collision in order to prevent this phenomenon.

Reinforcing a seat frame and the like of the vehicle seat in order to secure seat rigidity has the disadvantage of increasing the mass of the vehicle seat.

In consideration of the above circumstances, an object of the present disclosure is to provide a vehicle seat that improves seat rigidity in a collision while suppressing an increase in mass.

A vehicle seat of a first aspect of the present disclosure is mounted with an occupant restraint device. The vehicle seat includes a seat cushion frame, a seatback frame, a metal inflating body, and a drive member. The seat cushion frame forms a framework of a seat cushion. The seatback frame includes a seatback side frame extending in a seat vertical direction at a seat width direction end portion of the seatback frame, the seatback frame is supported so as to be swingable at a seat rear end side of the seat cushion frame, and the seatback frame extends from the seat rear end side of the seat cushion frame toward a seat upper side. The metal inflating body is disposed along the seatback side frame, and is configured so as to be stretched out toward a seat lower side and abut a vehicle floor surface. The drive member is configured to stretch out the metal inflating body in a case in which a vehicle collision at a seat front side occurs or in a case in which a vehicle collision at the seat front side has been predicted.

In the vehicle seat with this configuration, the vehicle seat is provided with the occupant restraint device, for example a seatbelt. Thus, while the seatbelt restrains an occupant, for example in a case in which a pre-tensioner or the like actuates during a vehicle collision from the seat front side, a load toward the seat front side is input to the seatback through the seatbelt as a result of inertial movement of the occupant toward the seat front.

The vehicle seat is provided with the metal inflating body that is disposed along the seatback side frame and that is capable of stretching out toward the seat lower side. The drive member stretches out the metal inflating body when a vehicle collision at the seat front side occurs or when a vehicle collision at the seat front side has been predicted. A seat lower side end portion of the stretched-out metal inflating body thereby abuts the vehicle floor surface. Contact surface area between the vehicle seat and the vehicle floor surface (vehicle body side) is increased by the metal inflating body, thereby increasing the rigidity of the seat. Forward collapse of the seatback is prevented or suppressed as a result.

In other words, a load counteracting the load, which is transmitted from the seatback frame to the vehicle floor surface through the metal inflating body, acts on the seatback through the metal inflating body. Namely, although a moment in a forward-tilting direction acts on the seatback due to the occupant restraint device, a moment in a rearward-tilting direction also acts on the seatback due to the counteracting load that is input from the metal inflating body, which abuts the vehicle floor surface. Forward collapse of the seatback can be prevented or suppressed as a result.

Note that the metal inflating body is normally disposed along the seatback side frame and does not abut the vehicle floor surface, such that a swing action (reclining operation) of the seatback is not hindered.

A vehicle seat of a second aspect of the present disclosure is the first aspect, wherein the metal inflating body includes a vertical direction portion disposed along the seatback side frame, a bent portion that is bent toward the seat front side at a lower end portion of the vertical direction portion, and a front-rear direction portion that extends from the bent portion toward the seat front side.

The bent portion is provided between the vertical direction portion and the front-rear direction portion of the metal inflating body. Thus, the bent portion is deformed when the metal inflating body is stretched out so as to be deformed and displaced. Specifically, the bend angle at the bent portion is reduced as the metal inflating body is stretched out, thereby enabling the metal inflating body to be deployed smoothly.

A vehicle seat of a third aspect of the present disclosure is the second aspect, wherein the metal inflating body includes a bellows portion folded into an accordion shape between the bent portion and the front-rear direction portion.

The bellows portion folded into an accordion shape is provided between the bent portion and the front-rear direction portion of the metal inflating body, thereby enabling the metal inflating body to be housed compactly within the vehicle seat, and also be made to reach the vehicle floor surface when stretched out.

A vehicle seat of a fourth aspect of the present disclosure is the second aspect, wherein the seatback side frame is provided at both seat width direction end portions of the vehicle seat, and the metal inflating body is configured with a rectangular shape in a seat front view. The metal inflating body includes a pair of vertical direction portions, a pair of bent portions, a pair of front-rear direction portions, an upper end portion linking upper ends of the pair of vertical direction portions together, and a front end portion linking front ends of the pair of front-rear direction portions together.

The metal inflating body further includes the front end portion and the upper end portion, and is formed in a rectangular shape in seat front view. Thus, the front end portion, that is extended in the seat width direction within the stretched-out metal inflating body, abuts the vehicle floor surface. Namely, the contact surface area of the vehicle seat against the vehicle floor surface is increased by the metal inflating body, further improving seat rigidity. In particular, the metal inflating body is rectangular shaped in seat front view, and the front end portion that abuts the vehicle floor surface extends along the seat width direction. This enables sideways collapse of the seatback to be prevented or suppressed, even if impact load in the seat width direction acts on the seatback from the occupant restraint device in a side-on collision of the vehicle.

A vehicle seat of a fifth aspect of the present disclosure is the fourth aspect, wherein a side airbag for seat width direction collisions, configuring the occupant restraint device, and an inflator to supply actuating gas to the side airbag are disposed at s seatback side frame on one end side in the seat width direction of the vehicle seat, and the drive member is provided at a seatback side frame on another end side in the seat width direction of the vehicle seat.

In the vehicle seat with this configuration, the inflator of the side airbag is disposed at the seatback side frame on the one end side in the seat width direction. The drive member for the metal inflating body is disposed at the seatback side frame on the other end side in the seat width direction. This enables the side airbag and the metal inflating body to be disposed compactly within the seatback.

Due to having the configuration described above, the vehicle seats of the first aspect to the fourth aspect enable seat rigidity to be increased while suppressing an increase in the mass of the vehicle seat.

Due to having the configuration described above, the vehicle seat of the fifth aspect enables the vehicle seat to be compactly formed.

BRIEF DESCRIPTION OF THE DRAWINGS

Preferred embodiments will be described in detail based on the following figures, wherein.

DETAILED DESCRIPTION

Explanation follows regarding a vehicle seat according to an exemplary embodiment of the present disclosure, with reference to FIG. 1 to FIG. 7B. The drawings are schematic, and elements that are not relevant to the present exemplary embodiment are omitted. Note that in the drawings, the arrow FR indicates a vehicle forward direction, the arrow W indicates a vehicle width direction, and the arrow UP indicates a vehicle upward direction. Moreover, in the present exemplary embodiment, a seat forward direction, a seat width direction, and a seat upward direction are substantially aligned with the vehicle forward direction, the vehicle width direction, and the vehicle upward direction respectively, and are therefore equivalent to the vehicle forward direction, the vehicle width direction, and the vehicle upward direction.

Configuration

Figure 1:
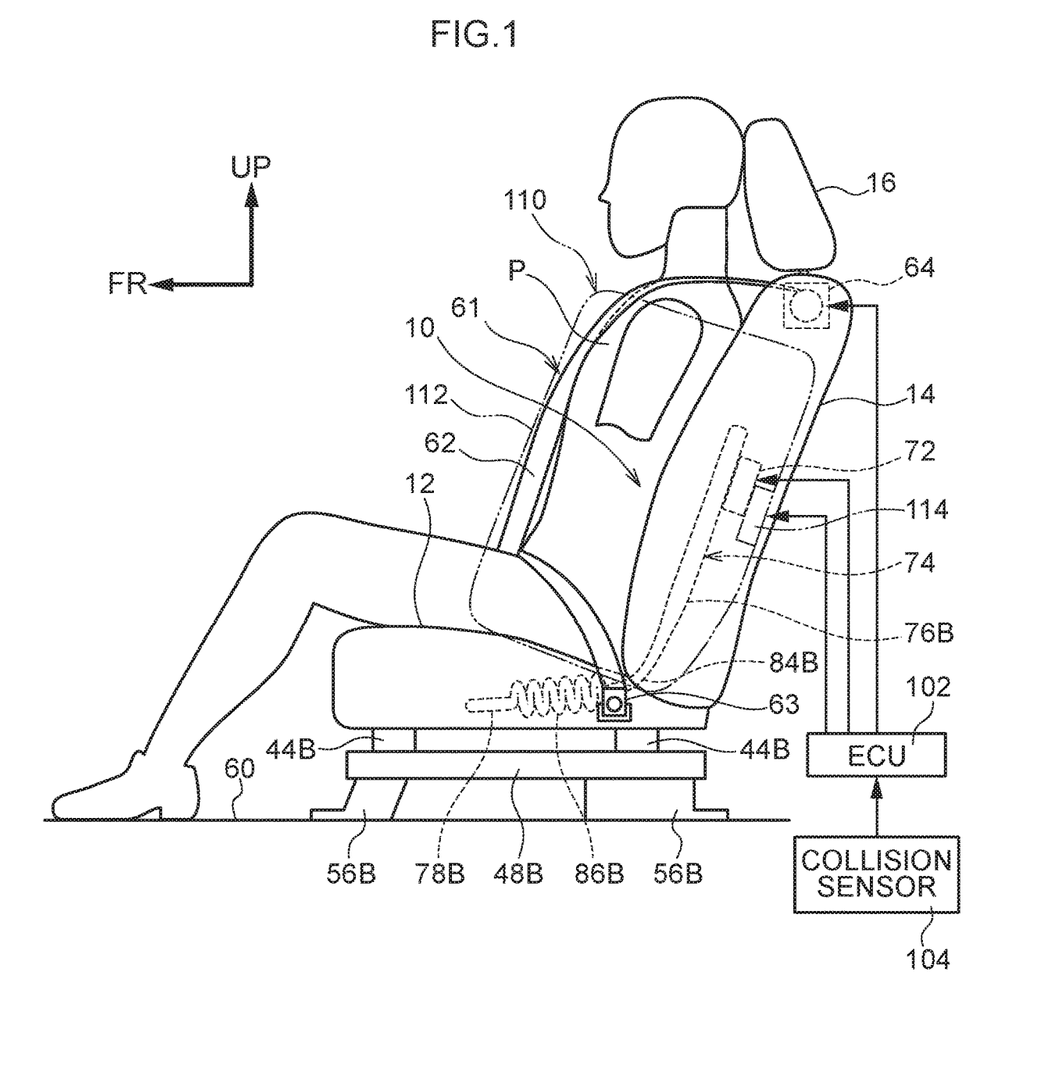
FIG. 1 is a side view illustrating a vehicle seat according to an exemplary embodiment of the present disclosure when an occupant is in a seated state.

As illustrated in FIG. 1, an automobile vehicle seat (referred to hereafter as "vehicle seat") 10 according to the present exemplary embodiment is provided at a front passenger seat side, this being a vehicle front seat on the left side of a cabin.

As illustrated in FIG. 1, the vehicle seat 10 includes a seat cushion 12 on which an occupant P sits, a seatback 14 that supports the back of the occupant P at a rear end portion of the seat cushion 12, and a headrest 16 that is disposed at an upper end portion of the seatback 14 and supports the head of the occupant P.

Figure 3:
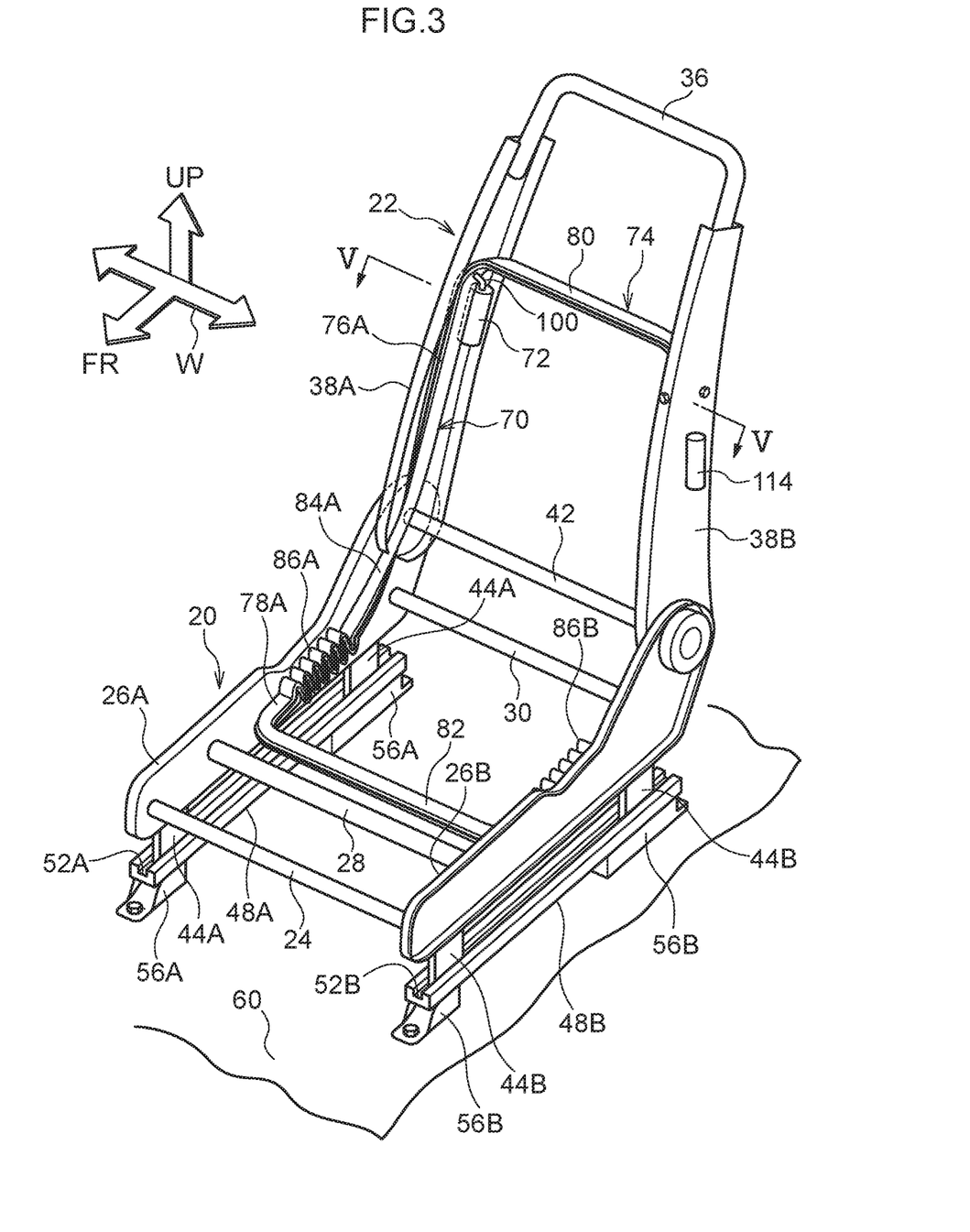
FIG. 3 is a perspective view illustrating a seat frame structure in a vehicle seat according to an exemplary embodiment.

As illustrated in FIG. 3, a seat cushion frame 20 and a seatback frame 22 are disposed inside the vehicle seat 10 (the seat cushion 12 and the seatback 14). The seatback frame 22 is axially supported by a reclining rod 42 so as to be swingable at a rear end of the seat cushion frame 20, described later.

As illustrated in FIG. 3, the seat cushion frame 20 includes a front frame 24 and a pair of side frames 26A, 26B. The front frame 24 extends along the vehicle width direction at a vehicle front side of the seat cushion frame 20, and the side frames 26A, 26B extend from the two vehicle width direction end portions of the front frame 24 toward the vehicle rear. The seat cushion frame 20 is further provided with plural cross members 28, 30 extending along the seat width direction so as to span between the pair of side frames 26A, 26B at the vehicle rear side of the front frame 24. Note that the side frames 26A, 26B each correspond to a "seat cushion side frame".

The seatback frame 22 includes an upper frame 36, a pair of side frames 38A, 38B, and the reclining rod 42. The upper frame 36 extends along the vehicle width direction at an upper end of the seatback frame 22. The pair of side frames 38A, 38B extend from the two vehicle width direction end portions of the upper frame 36 in a vehicle downward direction. The reclining rod 42 extends along the vehicle width direction between vehicle lower end portions of the side frames 38A, 38B. Note that the side frames 38A, 38B correspond to a "seatback frame".

The reclining rod 42 is axially supported between rear end portions of the side frames 26A, 26B of the seat cushion frame 20, such that the seatback frame 22 (seatback 14) is capable of swinging with respect to the seat cushion frame 20 (seat cushion 12).

Note that as illustrated in FIG. 3, in the vehicle seat 10, upper rails 44A, 44B formed at vehicle lower portions of the side frames 26A, 26B are inserted into rail grooves 52A, 52B in lower rails 48A, 48B that extend along the vehicle front-rear direction. Namely, the vehicle seat 10 is capable of sliding in the vehicle front-rear direction along the lower rails 48A, 48B. The lower rails 48A, 48B are respectively attached to a vehicle floor surface 60 through a pair of attachment portions 56A, 56B.

Figure 2:
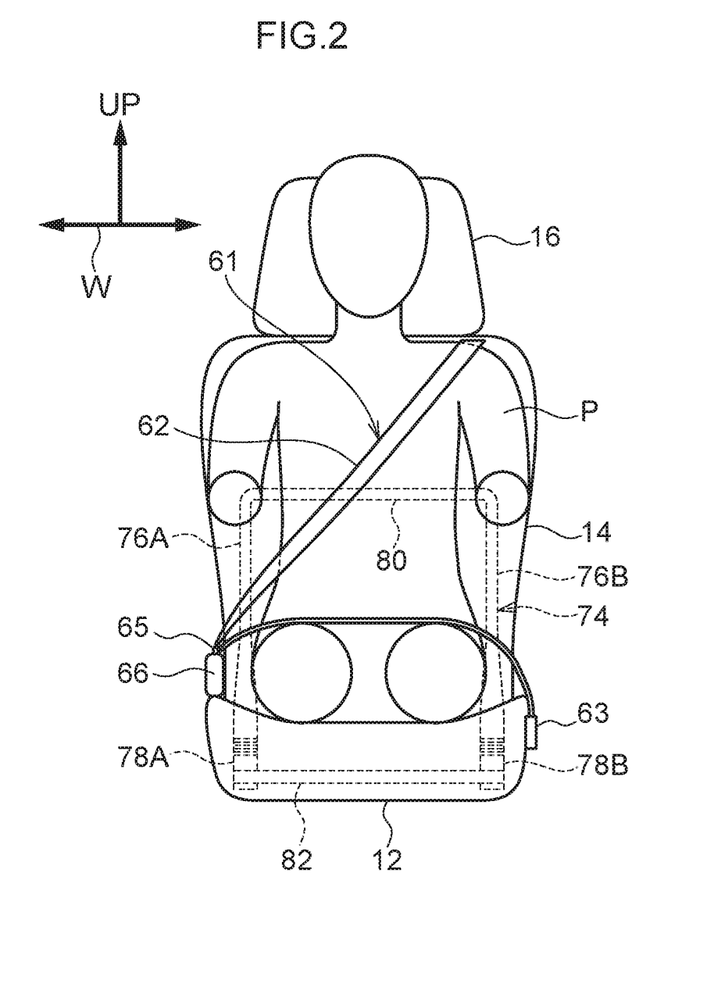
FIG. 2 is a front view illustrating a vehicle seat according to an exemplary embodiment when an occupant is in a seated state.

As illustrated in FIG. 1 and FIG. 2, the vehicle seat 10 is further provided with a seatbelt device 61, this being what is referred to as a three-point seatbelt device. The seatbelt device 61 includes a seatbelt (webbing) 62, an anchor plate 63, a retractor 64, and a buckle 66. One end of the seatbelt 62 is anchored to the anchor plate 63. The other end of the seatbelt 62 is anchored to the retractor 64, which is provided inside the seatback 14 and includes a pre-tensioner that applies a predetermined tension to the seatbelt 62. A tongue plate 65 through which the seatbelt 62 is inserted is fixed by being fitted together with the buckle 66. Note that the anchor plate 63 is attached to the side frame 26B. Namely, the seatbelt device 61 is mounted entirely to the vehicle seat 10. The seatbelt device 61 corresponds to an "occupant restraint device".

As illustrated in FIG. 1, a side airbag device 110 is attached to a vehicle width direction outer side of the side frame 38B of the vehicle seat 10. The side airbag device 110 includes a side airbag 112 and an inflator 114. The side airbag 112 (illustrated in an inflated and deployed state in FIG. 1) inflates and deploys at the vehicle width direction outer side of the occupant P in a side-on collision. The inflator 114 supplies actuating gas to the side airbag 112. The side airbag device 110 corresponds to an "occupant restraint device".

As illustrated in FIG. 3, a forward-tilt prevention mechanism 70 is provided at the vehicle width direction inner side of the side frames 38A, 38B of the seatback frame 22 and the side frames 26A, 26B of the seat cushion frame 20.

The forward-tilt prevention mechanism 70 is configured including an inflator 72 and a metal airbag 74. The metal airbag 74 stretches out when supplied with actuating gas from the inflator 72. The inflator 72 corresponds to a "drive member", and the metal airbag 74 corresponds to a "metal inflating body".

The inflator 72 is attached to the side frame 38A on the opposite side to the side frame 38B to which the inflator 114 of the side airbag device 110 is attached (in FIG. 1, for ease of explanation, the inflator 72 is illustrated at a position to the vehicle rear of a vertical direction portion 76B. In reality, however, the inflator 72 is positioned at the vehicle rear of a vertical direction portion 76A (see FIG. 3)).

As illustrated in FIG. 2, the metal airbag 74 has a substantially rectangular shape in front view so as to be disposed about an inner periphery of the vehicle seat. Namely, the metal airbag 74 includes the vertical direction portions 76A, 76B extending substantially along the vehicle vertical direction so as to follow the side frames 38A, 38B, front-rear direction portions 78A, 78B extending substantially along the vehicle front-rear direction so as to follow the side frames 26A, 26B, an upper end portion 80 linking together upper end portions of the vertical direction portions 76A, 76B in the vehicle width direction, and a front end portion 82 linking together front end portions of the front-rear direction portions 78A, 78B in the vehicle width direction.

Figure 6A:
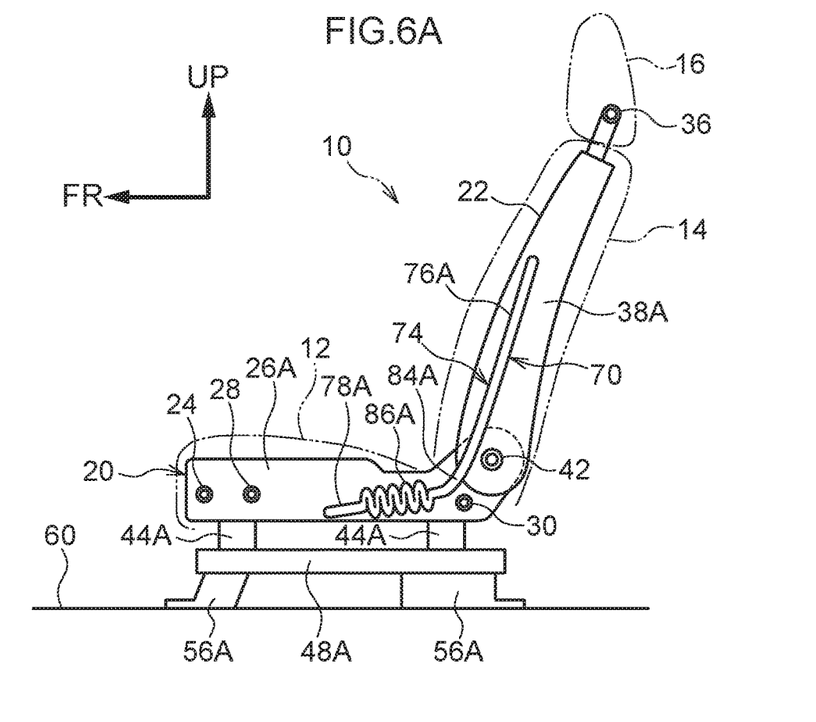
FIG. 6A is a schematic side view cross-section illustrating a vehicle width direction inner side of a seat frame, sectioned at a seat-width center of a vehicle seat according to an exemplary embodiment, illustrating a normal state (no collision at the seat front side) of the vehicle seat.

Moreover, as illustrated in FIG. 1, FIG. 3, and FIG. 6A, bent portions 84A, 84B are formed so as to link the front-rear direction portions 78A, 78B to the vertical direction portions 76A, 76B. Bellows portions 86A, 86B, which are folded in an accordion shape, are formed at the metal airbag 74 at front-rear direction portion 78A, 78B sides of the bent portions 84A, 84B.

Figure 4A:
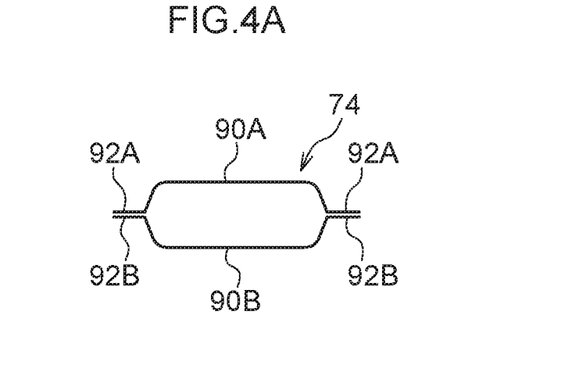
FIG. 4A is a schematic cross-section illustrating a normal state (no collision at a seat front side) of a metal inflating body according to an exemplary embodiment.
Figure 4B:
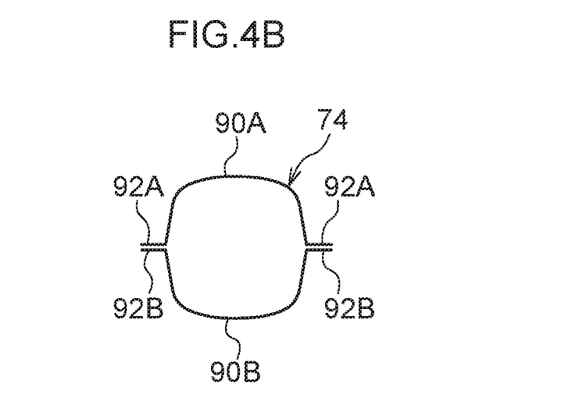
FIG. 4B is a schematic cross-section illustrating a state of a metal inflating body according to an exemplary embodiment in a collision at the seat front side.

The metal airbag 74 has the same cross-section profile around its entire periphery. As illustrated in FIG. 4A, the metal airbag 74 is configured with a closed cross-section profile by joining together outer side portions of two pairs of end portions 92A, 92B of two metal sheets 90A, 90B that have hat-shaped cross-section profiles (for ease of explanation, the two end portions 92A, 92B appear to be separate from each other in FIG. 4A). In the following explanation, each pair of joined end portions 92A, 92B is also referred to as a flange 92.

Figure 5:
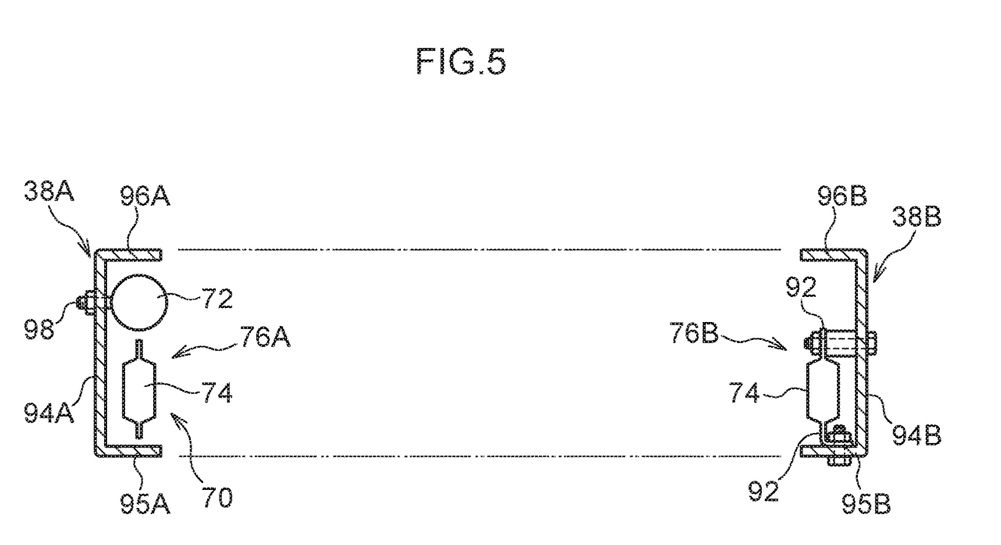
FIG. 5 is an enlarged cross-section taken along line V-V in FIG. 3.

The metal airbag 74 formed in this manner is attached to the side frames 38A, 38B in the following manner. As illustrated in FIG. 5, the side frames 38A, 38B respectively include side faces 94A, 94B that extend along the vehicle front-rear direction, and front faces 95A, 95B and rear faces 96A, 96B that respectively project toward the vehicle width direction inner side from vehicle front end portions and vehicle rear end portions of the side faces 94A, 94B. The vertical direction portions 76A, 76B of the metal airbag 74 are disposed so as to follow the extension directions of the side frames 38A, 38B at inner sides of the side frames 38A, 38B.

The vertical direction portion 76A is attached to the side frame 38A by being fastened to the side face 94A using a stud bolt 98 extending from the inflator 72 toward the seat width direction outer side.

The vertical direction portion 76B is attached by respectively fastening the pair of flanges 92, 92 to the front face 95B and the side face 94B of the side frame 38B.

As illustrated in FIG. 3, the inflator 72 is connected to the metal airbag 74 via a connecting passage 100.

The metal airbag 74 is attached to the side frames 38A, 38B in the manner described above, but is not fixed to the side frames 26A, 26B of the seat cushion frame 20. This is so as to allow the metal airbag 74 to deform as described below.

An upper side of the metal airbag 74 is connected to the inflator 72 in the above manner. Configuration is made such that when actuating gas is supplied from the inflator 72, the metal airbag 74 deforms such that an angle of the bend of the bent portions 84A, 84B becomes smaller and the bellows portions 86A, 86B are straightened out. A lower end portion (the front end portion 82) of the metal airbag 74 accordingly abuts (is pressed against) the vehicle floor surface 60 (see FIG. 6B).

As illustrated in FIG. 6A, the front-rear direction portions 78A, 78B and the front end portion 82 of the metal airbag 74 are positioned inside the side frames 26A, 26B in vehicle side view. Namely, the front-rear direction portions 78A, 78B and the front end portion 82 of the metal airbag 74 do not project out in the vehicle downward direction below the side frames 26A, 26B of the seat cushion frame 20. Note that the upper end portion 80 and the front end portion 82 are omitted from illustration in FIG. 6A.

As illustrated in FIG. 1, the retractor 64 (pre-tensioner), the forward-tilt prevention mechanism 70 (inflator 72), and the side airbag device 110 (inflator 114) are electrically connected to an ECU 102. A collision sensor 104 is also electrically connected to the ECU 102. The collision sensor 104 outputs a signal to the ECU 102 according to whether or not the automobile has been involved in a collision, and according to a collision mode. The ECU 102 is configured to output drive signals to the retractor 64 and the forward-tilt prevention mechanism 70 when a frontal collision has been detected. The ECU 102 is further configured to output drive signals to the retractor 64, the forward-tilt prevention mechanism 70, and the side airbag device 110 when a side-on collision has been detected. Note that the ECU 102 and the collision sensor 104 are omitted from illustration with the exception of in FIG. 1.

Operation

Explanation follows regarding operation and advantageous effects of the vehicle seat 10 configured in this manner.

Frontal Collision

When the ECU 102 has detected a frontal collision to the automobile based on the signals input from the collision sensor 104, which configures the vehicle seat 10, drive signals are output from the ECU 102 to the retractor 64 (pre-tensioner) and to the forward-tilt prevention mechanism 70 (inflator 72). The pre-tensioner of the retractor 64 accordingly actuates, taking up the seatbelt 62 and thereby restraining the occupant P.

In response to the drive signal from the ECU 102, the inflator 72 supplies actuating gas to the metal airbag 74. As a result, the cross-section of the metal airbag 74 expands and the bellows portions 86A, 86B are straighten out, such that the lower end portion of the metal airbag 74, namely, the front end portion 82, abuts (is pressed against) the vehicle floor surface 60 in the vehicle downward direction (see FIG. 6B, FIG. 7A).

Figure 7A:
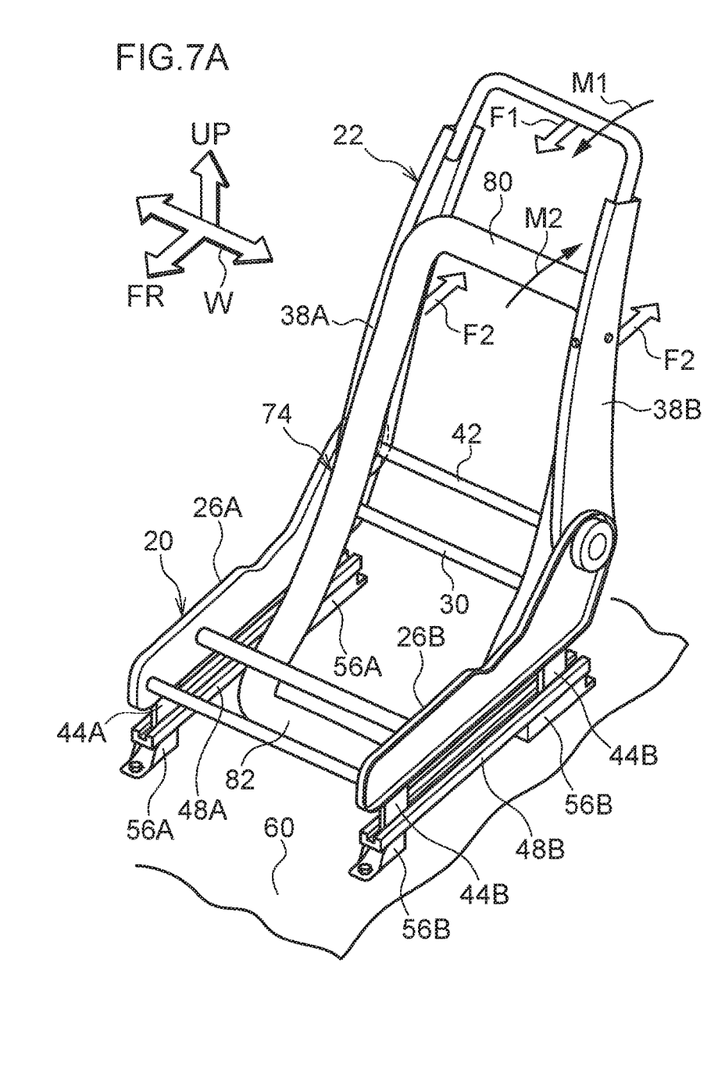
FIG. 7A is a perspective view to explain an operation to suppress forward collapse of a seatback in a vehicle frontal collision.

As illustrated in FIG. 7A, in a frontal collision, a load Fl toward the vehicle front is input to an upper portion of the seatback 14 through the seatbelt 62 as a result of inertial movement of the occupant P, such that a moment M1 acts in a forward-tilting direction on the seatback 14 (seatback frame 22). When this occurs, the metal airbag 74 is stretched out such that the front end portion 82 positioned at the lower end portion of the metal airbag 74 is pressed against the vehicle floor surface 60. Namely, the contact surface area between the vehicle seat 10 and the vehicle floor surface 60 is increased, thereby increasing the rigidity (bending rigidity) of the seat, and preventing or suppressing forward collapse of the seatback 14 of the vehicle seat 10.

In other words, load toward the vehicle front is transmitted to the vehicle floor surface 60 through the metal airbag 74 that has stretched out from the seatback frame 22, such that a counteracting load F2 from the vehicle floor surface 60 is input to the seatback 14 through the metal airbag 74. A moment M2 accordingly acts on the seatback 14 in the opposite direction (in a rearward-tilting direction) to the acting direction of the moment Ml. Forward collapse of the seatback 14 can be prevented or suppressed as a result.

Forward collapse of the seatback 14 is suppressed simply by the addition of the forward-tilt prevention mechanism 70 configured by the metal airbag 74, enabling the rigidity of the seat (seatback) to be improved, thereby preventing or suppressing forward collapse of the seatback 14, while suppressing an increase in the mass of the vehicle seat 10.

Moreover, the metal airbag 74 is provided with the bent portions 84A, 84B between the vertical direction portions 76A, 76B and the front-rear direction portions 78A, 78B. Thus, the metal airbag 74 deforms while stretching out (inflating), thereby decreasing the angle of the respective bends between the vertical direction portions 76A, 76B and the front-rear direction portions 78A, 78B. This thereby enables the metal airbag 74 to be stretched out smoothly. Namely, stretching out of the metal airbag 74 is suppressed from being obstructed by an end portion of the metal airbag 74 striking the vehicle floor surface 60 before the metal airbag 74 sufficiently stretches out.

When the forward-tilt prevention mechanism 70 has not been actuated, the metal airbag 74 is positioned at the vehicle front of the reclining rod 42, and does not project out in the vehicle downward direction below the side frames 26A, 26B of the seat cushion frame 20. Accordingly, the metal airbag 74 does not obstruct a swing operation of the seatback 14 during a reclining operation.

In the metal airbag 74, the angle of inclination of the front-rear direction portions 78A, 78B is smaller than that of the vertical direction portions 76A, 76B due to the bent portions 84A, 84B, and the metal airbag 74 is disposed so as not to project out in the vehicle downward direction below the seat cushion 12 in vehicle side view when in the normal situation. Accordingly, a seat occupant at the rear of the vehicle seat 10 is able to insert their feet smoothly at a vehicle lower side of the seat cushion 12. Namely, there is plenty of room for leg insertion.

The metal airbag 74 is provided with the bellows portions 86A, 86B folded in an accordion shape between the bent portions 84A, 84B and the front-rear direction portions 78A, 78B. The metal airbag 74 can accordingly be housed compactly within the vehicle seat 10, and can also be made to reach (be made to abut) the vehicle floor surface 60 by straightening out the bellows portions 86A, 86B as the metal airbag 74 stretches out.

Side-On Collision

When the ECU has detected a side-on collision of the automobile based on the signals input from the collision sensor 104, the ECU 102 outputs drive signals to the retractor 64 (pre-tensioner) and the forward-tilt prevention mechanism 70 (inflator 72), as well as to the inflator 114 of the side airbag device 110.

The pre-tensioner of the retractor 64 is accordingly actuated, taking up the seatbelt 62 and thereby restraining the occupant, and the side airbag 112 inflates and deploys at the vehicle width direction outer side of the occupant P (see FIG. 1).

Figure 6B:
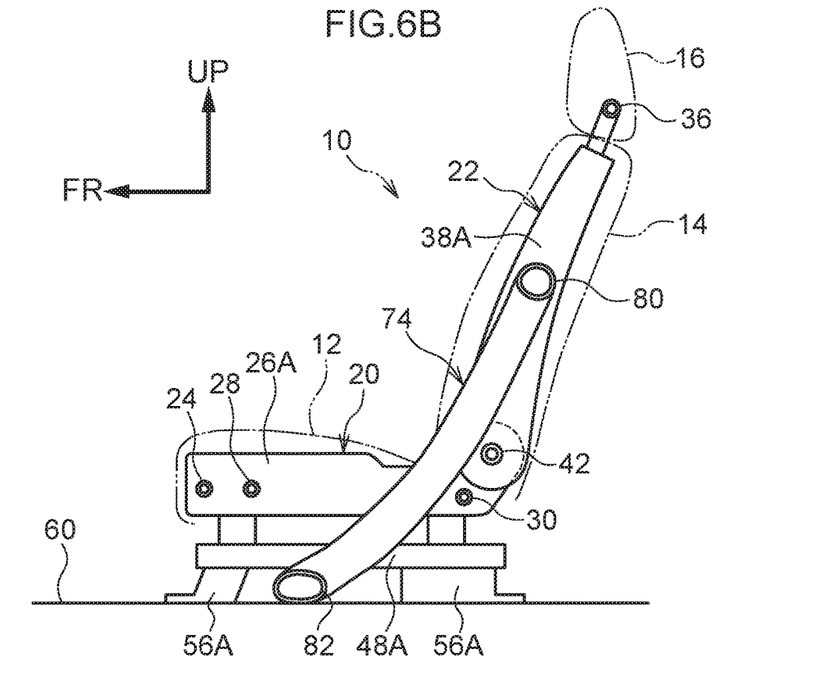
FIG. 6B is a schematic side view cross-section illustrating a vehicle width direction inner side of a seat frame, sectioned at a seat-width center of a vehicle seat according to an exemplary embodiment, illustrating a state of the vehicle seat in a collision at the seat front side.
Figure 7B:
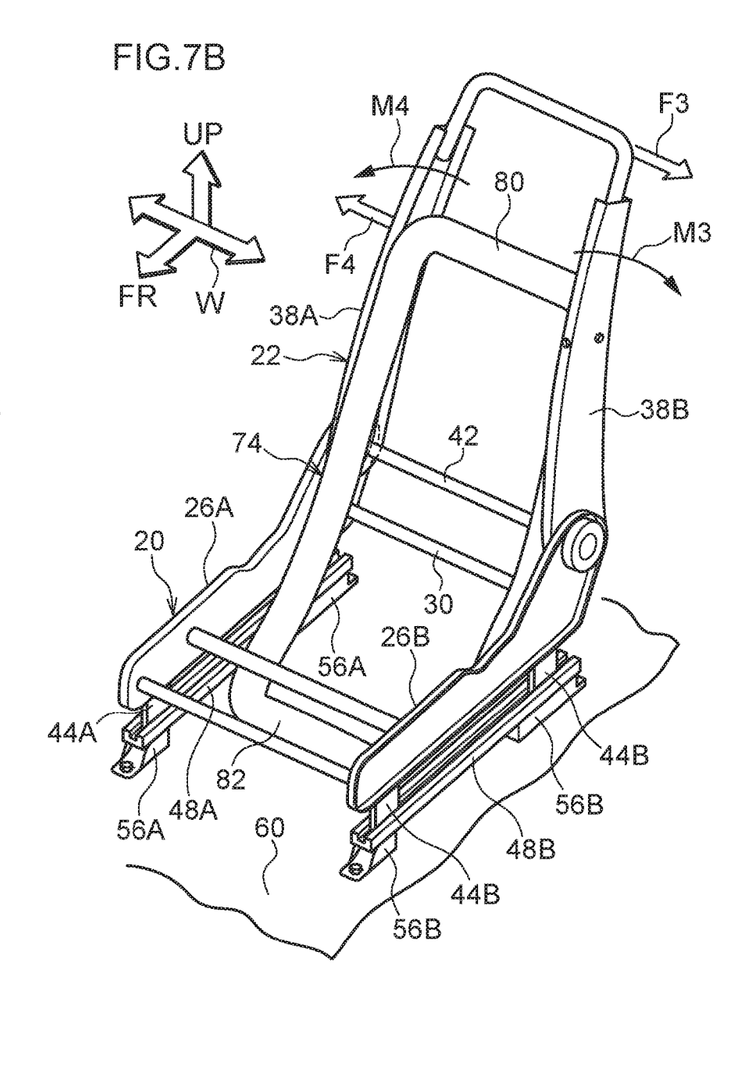
FIG. 7B is a perspective view to explain an operation to suppress lateral collapse of a seatback in a vehicle side-on collision.

As illustrated in FIG. 6B and FIG. 7B, the metal airbag 74 is also stretched out such that the front end portion 82 positioned at the lower end portion of the metal airbag 74, which extends along the vehicle width direction, abuts (strikes) the vehicle floor surface 60.

When this is performed, as illustrated in FIG. 7B, a load F3 toward the vehicle width direction outer side is input to the seatback 14 (seatback frame 22) through the side airbag 112 and the seatbelt 62 as a result of inertial movement of the occupant P in a side-on collision, such that a moment M3 acts in a direction to move the seatback 14 (seatback frame 22) toward the vehicle width direction outer side.

When this occurs, the metal airbag 74, which has a rectangular shape in front view, is stretched out such that the front end portion 82 positioned at the lower end portion of the metal airbag 74 is pressed against the vehicle floor surface 60. Namely, the contact surface area of the vehicle seat 10 against the vehicle floor surface 60 is increased, improving seat rigidity and preventing or suppressing sideways collapse of the seatback 14 of the vehicle seat 10.

In other words, load toward the vehicle width direction outer side is transmitted to the vehicle floor surface 60 through the metal airbag 74 that has stretched out from the seatback frame 22, such that a counteracting load F4 from the vehicle floor surface 60 is input to the seatback frame 22 through the metal airbag 74. Namely, a moment M4 acts on the seatback 14 in the opposite direction that moves the seatback 14 toward the vehicle width direction inner side. Sideways collapse of the seatback 14 can be prevented or suppressed as a result.

Moreover, in cases in which the side airbag 112 and the inflator 114 are disposed at the side frame 38B at the vehicle width direction outer side of the seatback frame 22, the side airbag and the metal airbag 74 can be compactly housed in the seatback 14 by providing the inflator 72 for the metal airbag 74 at the side frame 38A on the opposite side. This thereby enables the vehicle seat 10 to be more compactly formed.

Other

In the present exemplary embodiment, explanation has been given regarding the vehicle seat 10 configured by a front seat on the left side of the vehicle (a front passenger seat). However, the vehicle seat 10 may be similarly applied to a vehicle seat configuring a front seat on the right side of a vehicle (a driver's seat).

In the present exemplary embodiment, explanation has been given regarding a case in which the vehicle seat is disposed facing toward the vehicle front. However, for example, the present exemplary embodiment may also be applied to a vehicle seat disposed facing toward a side of the vehicle. In such a case, a metal airbag may be configured so as to be stretched out in the case of a collision at the seat front, that is a side-on collision to the vehicle, and in the case of a collision at a side of the seat, that is a frontal collision to the vehicle. As another example, the present exemplary embodiment may also be applied to a vehicle seat disposed facing toward the vehicle rear. In such a case, a metal airbag may be configured so as to be stretched out in the case of a collision at the seat front, that is a rear-end collision to the vehicle, and in the case of a collision at a side of the seat, that is a side-on collision to the vehicle.

Moreover, in the present exemplary embodiment, the pre-tensioner is driven and the metal airbag 74 is stretched out based on collision detection by the collision sensor 104. However, configuration may be made in which the pre-tensioner is driven and the metal airbag 74 is stretched out when a collision is detected to be inevitable based on the output of a pre-crash sensor.

Moreover, in the present exemplary embodiment, explanation has been given regarding a vehicle seat mounted with the seatbelt device 61 and the side airbag 112 that serve as restraint devices. However, there is no limitation thereto. For example, similar operation and advantageous effects are exhibited in cases in which a frontal collision airbag serving as a restraint device is mounted to a vehicle seat (seatback 14). Moreover, the present exemplary embodiment may be applied to a vehicle seat mounted with any one of the above restraint devices.

Moreover, in the present exemplary embodiment, the metal airbag 74 has a rectangular shape in front view of the vehicle. However, there is no limitation thereto. For example, a pair of substantially rod-shaped metal airbags may be configured by vertical direction portions 76A, 76B, bent portions 84A, 84B, and front-rear direction portions 78A, 78B. In such cases too, the pair of metal airbags are stretched out in a collision such that end portions of the front-rear direction portions 78A, 78B abut a vehicle floor surface while being stretched out, enabling the seat rigidity of the vehicle seat to be improved.

What is claimed is:

1. A vehicle seat mounted with an occupant restraint device for restraining a seated occupant, the vehicle seat comprising:
   a seat cushion frame forming a framework of a seat cushion;
   a seatback frame including a seatback side frame extending in a seat vertical direction at a seat width direction end portion of the seatback frame, the seatback frame being supported so as to be swingable at a seat rear end side of the seat cushion frame, and the seatback frame extending from the seat rear end side of the seat cushion frame toward a seat upper side;
   a metal inflating body disposed along the seatback side frame, and configured so as to be stretched out toward a seat lower side such that a lower end of the metal inflating body abuts a vehicle floor surface; and
   a drive member configured to stretch out the metal inflating body in a case in which a vehicle collision at a seat front side occurs or in a case in which a vehicle collision at the seat front side has been predicted.

2. The vehicle seat of claim 1,
   wherein the metal inflating body includes a vertical direction portion disposed along the seatback side frame, a bent portion that is bent toward a seat front side at a lower end portion of the vertical direction portion, and a front-rear direction portion that extends from the bent portion toward a seat front side.

3. The vehicle seat of claim 2, wherein the metal inflating body includes a bellows portion that is folded into an accordion shape between the bent portion and the front-rear direction portion.

4. The vehicle seat of claim 2, wherein:
   the seatback side frame is provided at both seat width direction end portions of the vehicle seat; and
   the metal inflating body is configured with a rectangular shape in a seat front view and includes
      a pair of vertical direction portions,
      a pair of bent portions,
      a pair of front-rear direction portions,
      an upper end portion linking upper ends of the pair of vertical direction portions together, and
      a front end portion linking front ends of the pair of front-rear direction portions together.

5. The vehicle seat of claim 4,
   wherein a side airbag for seat width direction collisions, configuring the occupant restraint device, and an inflator to supply actuating gas to the side airbag are disposed at a seatback side frame on one end side in the seat width direction of the vehicle seat, and the drive member is provided at a seatback side frame at another end side in the seat width direction of the vehicle seat.

\* \* \* \* \*